United States Patent
Hsu et al.

(10) Patent No.: US 9,165,105 B2
(45) Date of Patent: Oct. 20, 2015

(54) RULE CHECKING FOR CONFINING WAVEFORM INDUCED CONSTRAINT VARIATION IN STATIC TIMING ANALYSIS

(71) Applicant: Taiwan Semiconductor Manufacturing Co., Ltd., Hsin-Chu (TW)

(72) Inventors: Meng-Kai Hsu, Xinfeng Township (TW); Wen-Hao Chen, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/273,724

(22) Filed: May 9, 2014

(65) Prior Publication Data

US 2015/0169819 A1    Jun. 18, 2015

Related U.S. Application Data

(60) Provisional application No. 61/915,886, filed on Dec. 13, 2013.

(51) Int. Cl.
*G06F 17/50* (2006.01)

(52) U.S. Cl.
CPC .................. *G06F 17/5081* (2013.01)

(58) Field of Classification Search
CPC    G06F 17/505; G06F 17/5031; G06F 2217/84
USPC .......................................... 716/108, 113, 134
See application file for complete search history.

(56) References Cited

U.S. PATENT DOCUMENTS

| | | | | |
|---|---|---|---|---|
| 6,799,153 | B1 * | 9/2004 | Sirichotiyakul et al. | 703/19 |
| 7,701,255 | B2 * | 4/2010 | Cortadella et al. | 326/93 |
| 7,814,448 | B2 * | 10/2010 | Abbaspour et al. | 716/100 |
| 7,861,191 | B2 * | 12/2010 | Koch | 716/102 |
| 8,302,046 | B1 * | 10/2012 | Keller et al. | 716/108 |
| 8,327,308 | B2 * | 12/2012 | Nakagawa | 716/134 |
| 8,341,572 | B1 * | 12/2012 | Tiwary et al. | 716/108 |
| 8,516,420 | B1 * | 8/2013 | Kariat et al. | 716/108 |
| 8,601,420 | B1 * | 12/2013 | Keller et al. | 716/113 |
| 8,924,905 | B1 * | 12/2014 | Keller et al. | 716/113 |
| 2006/0112357 | A1 * | 5/2006 | Nazarian et al. | 716/4 |
| 2014/0068536 | A1 * | 3/2014 | Oda | 716/113 |

* cited by examiner

*Primary Examiner* — Sun Lin
(74) *Attorney, Agent, or Firm* — Duane Morris LLP (57) ABSTRACT

A method for design rule checking (DRC) during a static timing analysis (STA) of an integrated circuit (IC) design comprises analyzing cells with distorted waveforms in a cell library and generating both library-based waveforms and simulated waveforms for said each cell type according to a plurality of parameters for the cell type. The method further comprises constructing a lookup table based on analysis of the distorted waveforms, wherein the lookup table maps a waveform error to a hold time constraint error of each cell type in the library. The method further comprises identifying one or more cells in the IC design as risky for a timing constraint violation during the STA of the IC design according to the lookup table and re-optimizing the identified risky cell(s) is to reduce risk for the timing constraint violation of the IC design.

20 Claims, 11 Drawing Sheets

| Hold Time Constraint Error (ps) @ SVT | Delay: 10% Tran. Time | | | Delay: 20% Tran. Time | | | Delay: 30% Tran. Time | | |
|---|---|---|---|---|---|---|---|---|---|
| | Slew: 0.0776ns | Slew: 0.1552ns | Slew: 0.3104ns | Slew: 0.0776ns | Slew: 0.1552ns | Slew: 0.3104ns | Slew: 0.0776ns | Slew: 0.1552ns | Slew: 0.3104ns |
| Distortion starts at 0.1vdd | | | | | | | | | |
| 0.2vdd | 0.58 | 0.37 | 0.30 | 0.67 | 0.22 | 0.95 | 1.08 | 1.48 | 0.77 |
| 0.3vdd | 0.43 | 0.54 | 0.57 | 0.61 | 0.91 | 0.59 | 1.02 | 1.40 | 0.87 |
| 0.4vdd | 0.55 | 0.43 | 0.37 | 0.68 | 0.45 | 0.78 | 0.83 | 1.41 | 1.40 |
| 0.5vdd | 0.38 | 0.24 | 0.52 | 0.43 | 0.37 | 0.68 | 0.62 | 1.25 | 0.50 |
| 0.6vdd | 9.64 | 19.74 | 39.72 | 19.44 | 39.61 | 79.57 | 29.40 | 58.88 | 119.27 |
| 0.7vdd | 9.49 | 19.54 | 38.66 | 19.40 | 39.24 | 78.32 | 29.26 | 57.69 | 117.49 |
| 0.8vdd | 8.97 | 17.95 | 36.82 | 17.87 | 36.23 | 72.93 | 27.34 | 53.81 | 108.01 |
| 0.9vdd | 6.84 | 12.77 | 25.96 | 13.85 | 27.17 | 53.53 | 20.63 | 40.90 | 80.07 |
| | 3.26 | 5.90 | 6.72 | 7.02 | 11.09 | 7.59 | 10.57 | 14.09 | 6.76 |

| CP Slew | (Linear) Regression | Waveform Error Threshold (V*ps) | Constraint Error Threshold (ps) |
|---|---|---|---|
| 77.6ps | y=5.3x+4.2 | 5.0 | 20 |
|  |  | 6.8 | 40 |
|  |  | 12.5 | 60 |
| 155.2ps | y=4.7x-7.6 | 5.9 | 20 |
|  |  | 10.0 | 40 |
|  |  | 15.0 | 60 |

| Cell Type | Waveform Error Aerror(V*ps) | Constraint Error Threshold (ps) |
|---|---|---|
| SDFCND1BWP22P90 | 5 | 5 |
| SDFCND4BWP22P90 | 20 | 40 |
| SDFCND4BWP22P90ULVT | 30 | 20 |

FIG.5A

| Instances | Cell Type | Hold time constraint by library waveform (ps) | Hold time constraint by real waveform (ps) | Difference (ps) | Aerror(V*ps) | STA DRC |
|---|---|---|---|---|---|---|
| Cell_1/CP | SDFCND1BWP22P90 | 14.4 | 11.0 | 3.4 | 2.3 | No Violation |
| Cell_2/CP | SDFCND4BWP22P90 | 122.3 | 163.9 | 41.5 | 23.6 | Violation |
| Cell_3/CP | SDFCND4BWP22P90ULVT | 75.6 | 93.9 | 18.3 | 23.5 | No Violation |

RULE CHECKING FOR CONFINING WAVEFORM INDUCED CONSTRAINT VARIATION IN STATIC TIMING ANALYSIS

PRIORITY CLAIM AND CROSS-REFERENCE

This application claims the benefit of U.S. Provisional Patent Application No. 61/915,886, filed Dec. 13, 2013, and entitled "DRC Approach for Confining Waveform Induced Constraint Variation in Static Timing Analysis," and is hereby incorporated herein by reference.

BACKGROUND

This disclosure relates to static timing analysis of an integrated circuit.

Static timing analysis (STA) is a method of computing the expected timing of an integrated circuit (IC) without requiring conducting actual simulation of the circuit. High-performance integrated circuits have traditionally been characterized by the clock frequency at which they operate. Gauging the ability of an integrated circuit to operate at the specified speed requires an ability to measure, during the design process, its delay at numerous steps. Moreover, delay calculation should be incorporated into the inner loop of timing optimizers at various phases of design of the integrated circuit, such as logic synthesis, layout (placement and routing), and in-place optimizations performed late in the design cycle. While such timing measurements can theoretically be performed using a rigorous circuit simulation, static timing analysis plays a vital role in facilitating fast and reasonably accurate measurement of timing of the IC without actually conducting the simulation on the IC due to the use of simplified delay models during the STA.

For each cell in the IC, its characteristics are defined in a cell library for library-based static timing analysis. In the example of a cell being a flip-flop or a latch, a hold time constraint can be defined, which characterizes constraint on hold time of the cell defined as the minimum amount of time after the clock's active/rising edge during which data signal should be held steady so that the data are reliably sampled. If the hold time at the cell is less than the characterized hold time constraint/threshold, the flip flop may fall into the failure region and not be able to operate properly.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

This disclosure describes a new approach to design rule checking (DRC) process to confine waveform-induced constraint variation during static timing analysis of an IC. The DRC is aimed at preventing waveform distortion, which is measured by the difference between a library-based waveform of a cell in the IC during the during static timing analysis and a waveform from actual simulation of cell using a circuit simulation tool such as SPICE. During the static timing analysis, the DRC analyzes library cells with distorted waveforms and generates both library-based and simulated waveforms of cells in the IC based on the cell libraries used, as well as various parameters such as process, voltage, and temperature (PVT) set during fabrication, cell types, input slews, and output loadings of the cells. A DRC lookup table is constructed for waveform distortion prevention based on the waveform analysis and cells risky for timing constraint violations are identified according to the table. The identified risky cells are then re-optimized to reduce the risk for timing constraint violations for a robust design of the IC.

Figure 1A:
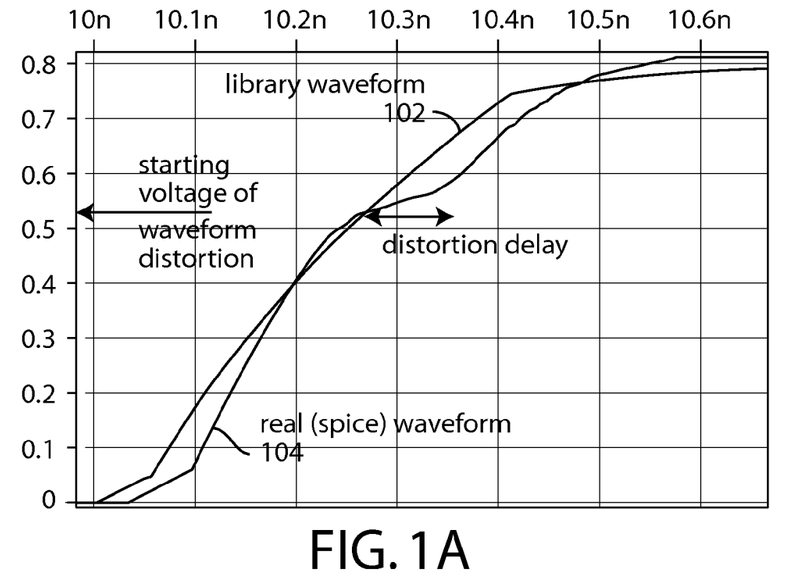
FIG. 1A depicts examples of two output waveforms and of a cell generated based on a cell library and a real circuit simulation, respectively, in accordance with some embodiments.

FIG. 1A depicts examples of two output waveforms 102 and 104 of a cell generated based on a cell library and a real circuit simulation, respectively. Here, both waveforms show output voltage of the cell over time. As shown in FIG. 1A, the waveforms of the cell are distorted as the library-based waveform 102 does not match with the simulated/real waveform 104 by SPICE. In some embodiments, the waveform distortion can be characterized by two indexes: distortion delay, which measures the time difference between the library-based waveform 102 and the simulation waveform 104, and starting voltage of waveform distortion, which identifies the voltage at which the waveforms 102 and 104 no longer match well with each other, i.e., distorted. For a non-limiting example, the starting voltage of waveform distortion can be at 0.5 Vdd. In some embodiments, the distortion delay can be measured as a percentage of the transition of the output waveform (e.g., 15% of the transition time).

Figure 1B:
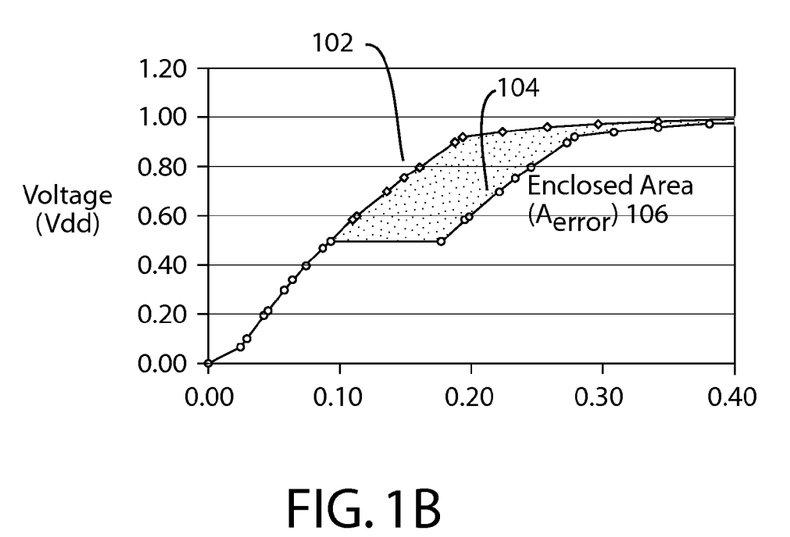
FIG. 1B depicts examples the library-based waveform and the simulated waveform with the enclosed area between the two waveforms highlighted, in accordance with some embodiments.

FIG. 1B depicts examples the library-based waveform 102 and the simulated waveform 104 with the enclosed area 106 between the two waveforms highlighted. The enclosed area 106 between the library-based waveform 102 and the simulated waveform 104 is also referred to as the waveform error, which reflects the extent of distortion between the waveforms. The larger the enclosed area 106 between the waveforms, the more severe the distortion between the waveforms.

Figure 2A:
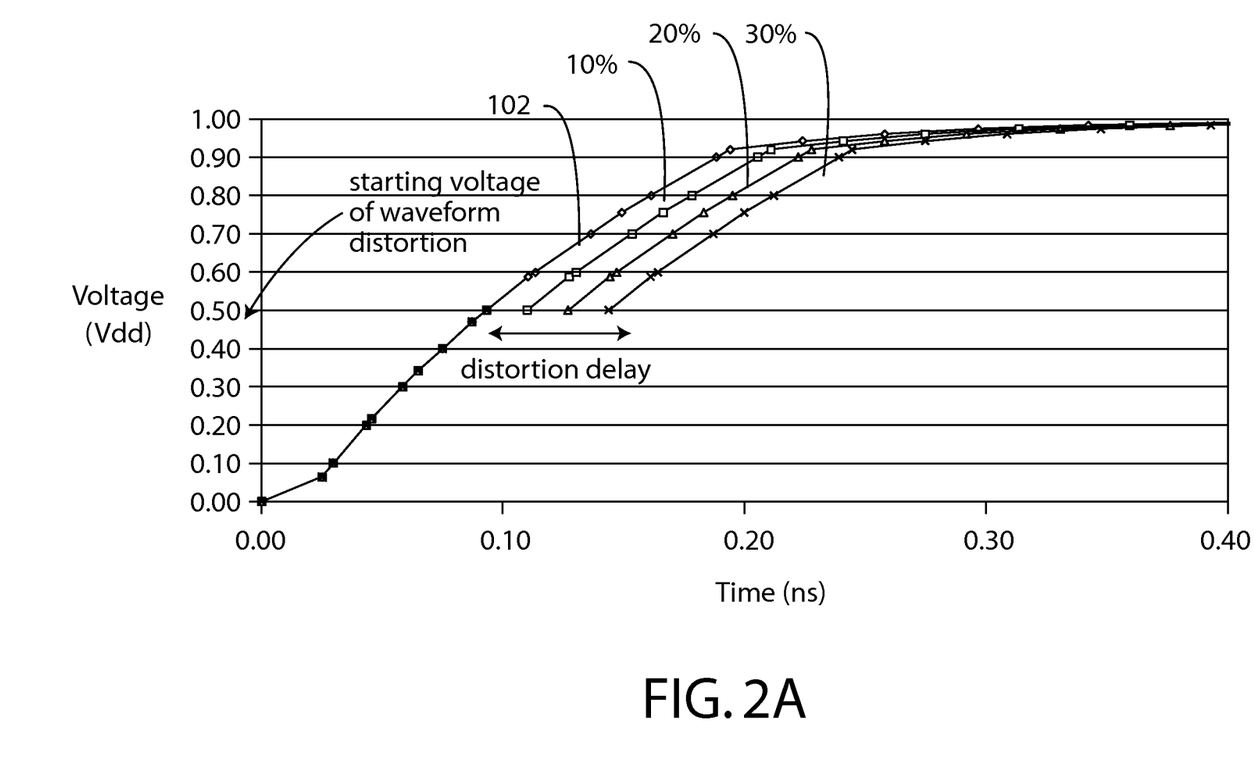
FIG. 2A depicts an example of a library-based waveform at a clock pin of a cell, wherein the waveform has been distorted by distortion delay that equals to 10%, 20%, 30% of transition time, respectively, in accordance with some embodiments.

In some embodiments, a lookup table is constructed for DRC under static timing analysis, wherein the DRC table maps the waveform error to the constraint characterization error for each cell in the IC. Here, the constraint characterization error (or hold time constraint error) of a cell is the difference between the hold time constraints characterized by the library waveform 102 and the simulated waveform 104. First, the library-based waveform 102 is obtained from a cell timing library, in which there is a corresponding library waveform for each type of cell depending on one or more of its PVT, cell type, input slew (the input transition time that measures the rising speed of the input signal), and output loading. The waveform 102 is then distorted with the two indexes mentioned above, (1) distortion delay, (2) starting voltage of waveform distortion, for the construction of the lookup table for DRC under static timing analysis. FIG. 2A depicts an example of a library-based waveform 102 at a clock pin (CP) of a cell (e.g., flip-flop), wherein the waveform 102 has been distorted by distortion delay that equals to 10%, 20%, 30% of transition time, respectively. Here, the CP waveform distortion measures the waveform distortion and delay at the clock pin of the flip flop. Such CP waveform distortion may lead to the violation of hold time constraint, e.g., when the hold time of the data is not long enough because of the CP waveform distortion.

Figure 2B:
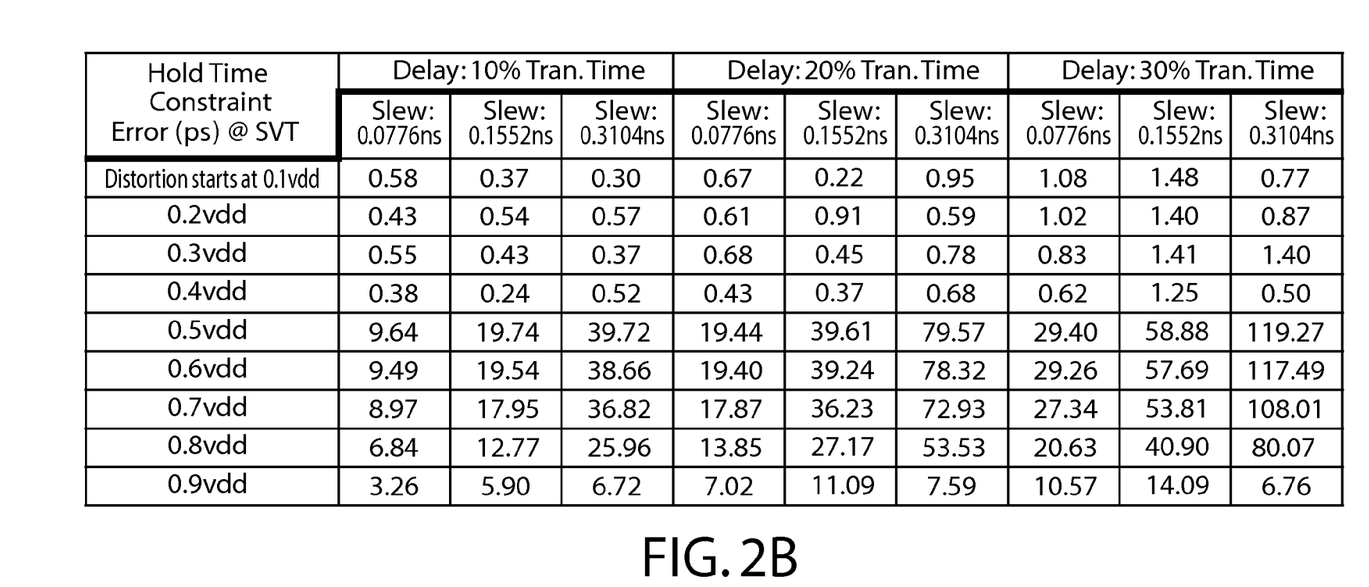
FIG. 2B depicts examples of simulation results of measured hold time constraint error of a flip-flop under various starting voltages of waveform distortion, distortion delays, and input slews, in accordance with some embodiments.

In some embodiments, once the distorted waveforms of a cell type are generated, simulated waveforms 104 are then generated for each of the distorted waveforms. The waveform error and the corresponding hold time constraint error between the library-based waveform and the simulated waveform are also calculated. FIG. 2B depicts examples of simulation results of measured hold time constraint error of a flip-flop under various starting voltages of waveform distortion ranging from 0.1 Vdd to 0.9 Vdd, distortion delays (10% to 30% transition time) and input slews, where SVT refers to standard threshold voltage for the flip-flop.

Figure 2C:
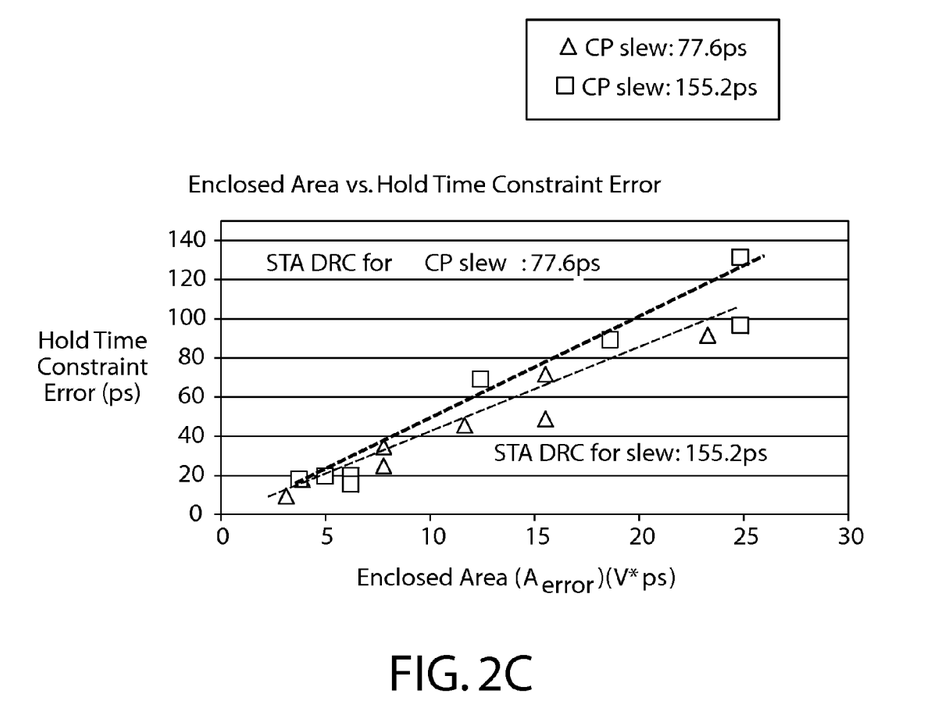
FIG. 2C depicts examples of the relationships between the waveform error measured as the enclosed area between the library-based waveform and the simulated waveform and the hold time constraint errors under different CP input slews, respectively, in accordance with some embodiments.
Figure 2D:
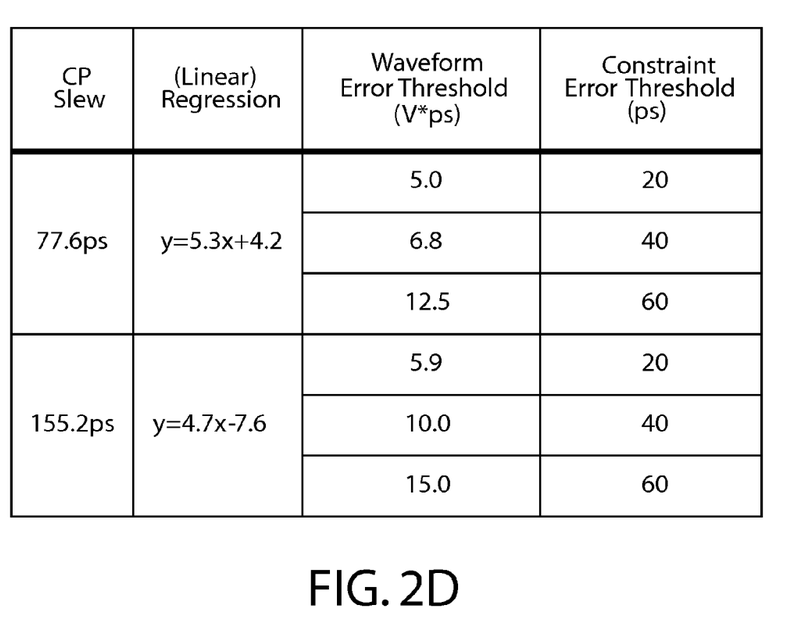
FIG. 2D shows an example of the DRC lookup table that includes equations reflecting the relationship between the waveform error and the hold time constraint error obtained via linear regressions under the two CP slew values shown in FIG. 2C, respectively, in accordance with some embodiments.

FIG. 2C depicts examples of the relationships between the waveform error measured as the enclosed area between the library-based waveform and the simulated waveform and the hold time constraint errors measured in ps under CP input slew of 77.6 ps and 155.2 ps, respectively. In some embodiments, the DRC lookup table includes a relationship between the waveform error as measured by the enclosed area and the hold time constraint error using regression techniques (e.g., linear regression), which fits the relationship between the two under each combination of PVT, cell type, input slew, and output loading of the cell. FIG. 2D shows an example of the DRC lookup table that includes equations reflecting the relationship between the waveform error and the hold time constraint error obtained via linear regressions under the two CP slew values shown in FIG. 2C, respectively. Under the DRC lookup table, there is an one-to-one correspondence between the hold time constraint error and the waveform error measured by enclosed area between the waveforms.

Figure 3:
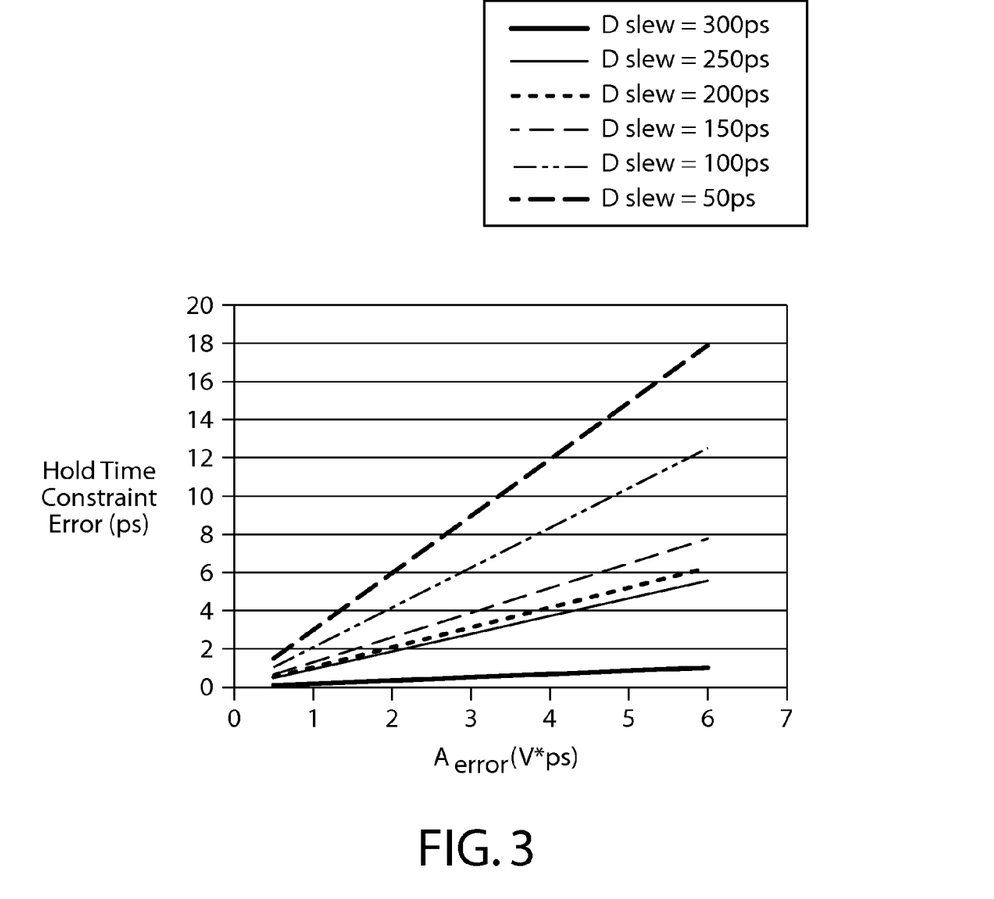
FIG. 3 depicts examples of the close-to-linear relationship between hold time constraint error and the waveform error under different input slews at input pin D of a flip-flop, in accordance with some embodiments.

FIG. 3 depicts examples of the close-to-linear relationship between hold time constraint error and the waveform error derived from linear regression approach discussed above under different input slews at input pin D of the flip-flop. As shown by FIG. 3, the hold time constraint error is highly sensitive to the waveform error when the slew rate at input pin D is small.

Figure 4:
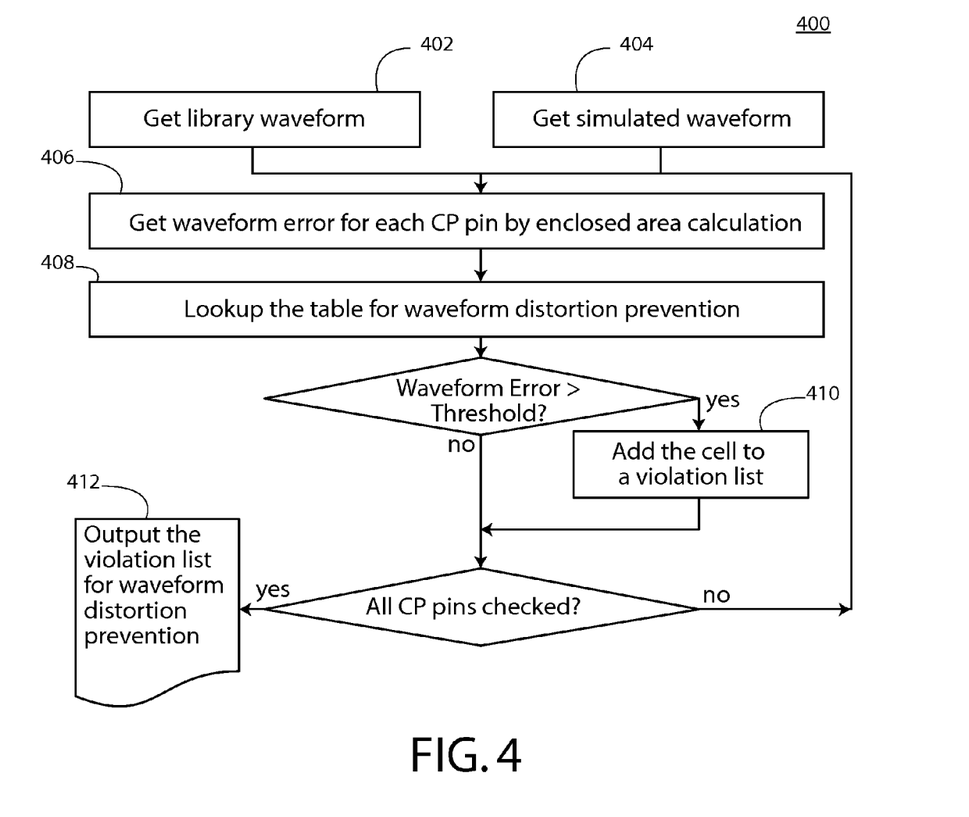
FIG. 4 is a flow chart of an example of DRC during static timing analysis for waveform distortion prevention based on the constructed DRC lookup table, in accordance with some embodiments.

FIG. 4 is a flow chart 400 of an example of DRC during static timing analysis for waveform distortion prevention based on the constructed DRC lookup table. At step 402, the library-based waveform for a clock pin of a cell is obtained based on a cell timing library and at step 404, the real waveform of the clock pin of cell is generated based on simulation result. The flow 400 continues to step 406, where the waveform error for the CP pin is calculated as the enclosed area between the library-based waveform library and the simulated waveform. At step 408, the DRC lookup table reflecting the relationship between the waveform error and the hold time constraint error is looked up during static timing analysis of the IC design. If the waveform error at a pin of a cell instance (or cell in short) in the IC design exceeds the threshold on the waveform error and/or the hold time constraint error of its cell type according to the DRC lookup table during static timing analysis of the IC design, the cell instance is identified as a risky cell during static timing analysis and the cell and/or the CP pin is added to a violation list at step 410. The above process is repeated for every CP pin of the cell until all CP pins are checked. At that point, the violation list is output at step 412 for re-optimization.

Figure 5A:
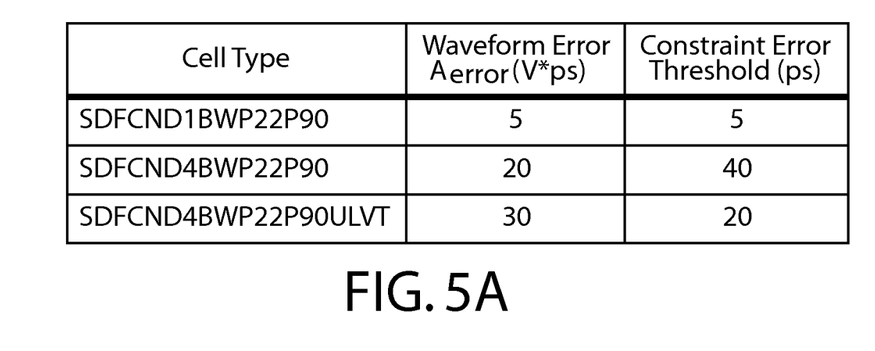
FIG. 5A depicts an example of a DRC lookup table including the thresholds on waveform error and the corresponding hold time constraint error for three different types of cells, in accordance with some embodiments.
Figure 5B:
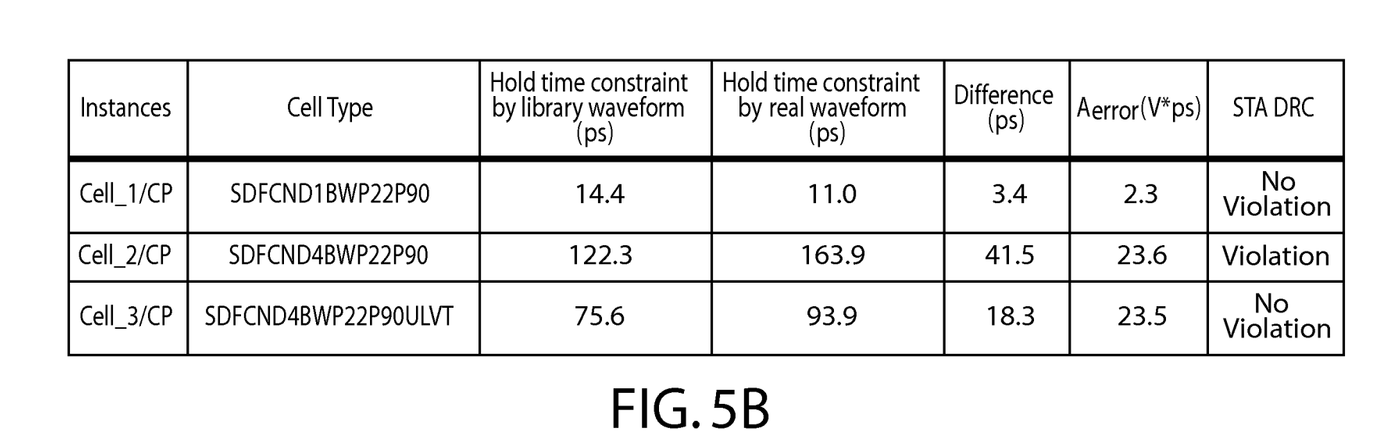
FIG. 5B depicts DRC results for three cells of the three respective types shown in FIG. 5A during a static timing analysis, in accordance with some embodiments.

For a non-limiting example, FIG. 5A depicts an example of a DRC lookup table including the thresholds on waveform error and the corresponding hold time constraint error for three different types of cells: D1 with high VT, D4 with high VT, and D4 with low VT. FIG. 5B depicts DRC results for three cells of the three respective types shown in FIG. 5A during a static timing analysis. As shown by FIG. 4B, the CP pin of Cell_2 of violates DRC and is identified as a risky cell since both of the hold time constraint error of 41.5 ps and its waveform error of 23.6 V*ps exceed the corresponding thresholds of 30 ps and 20 V*ps for the cell type C2.

Figure 6:
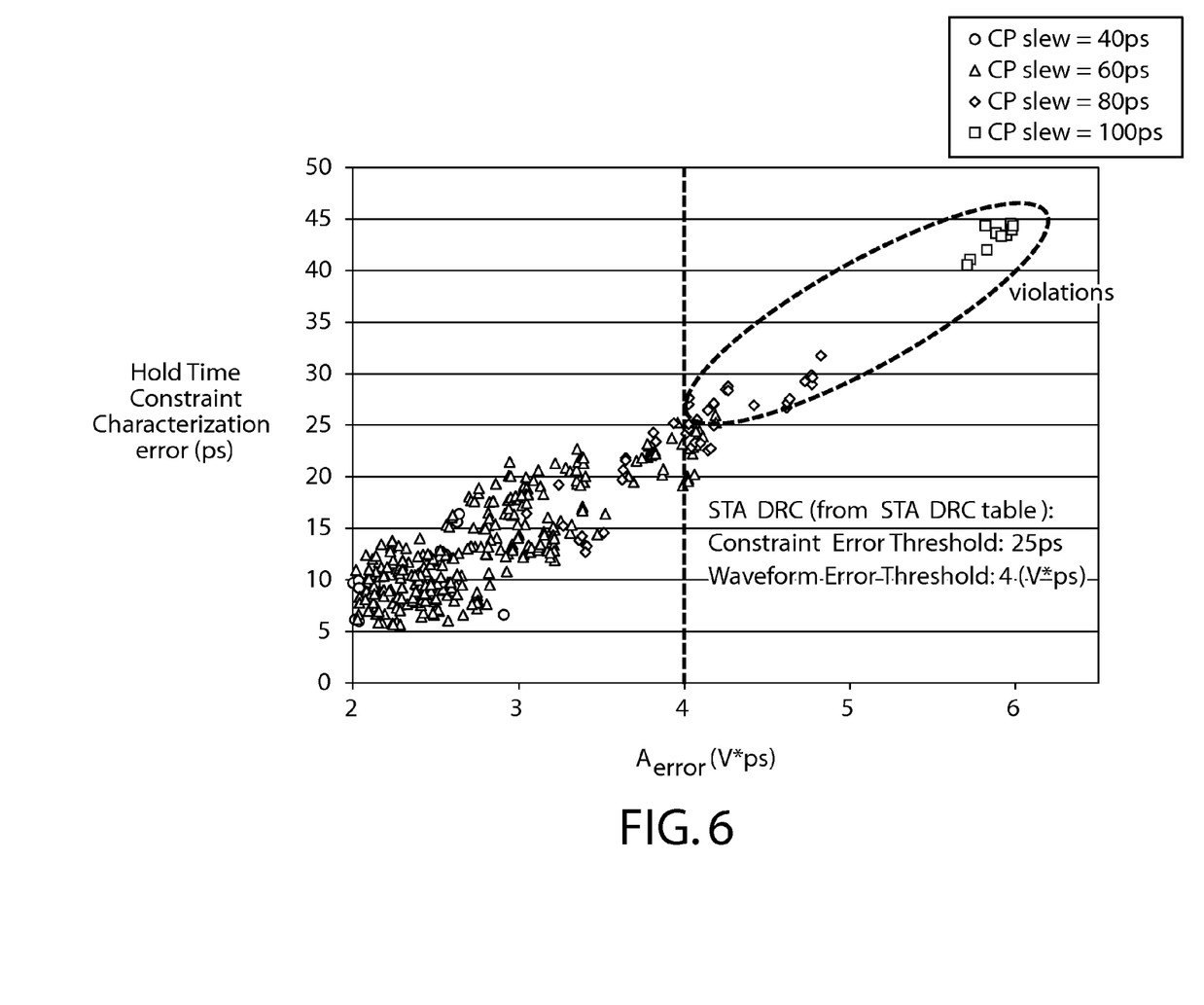
FIG. 6 depicts an example of a diagram showing waveform errors and the corresponding hold time constraint errors of cell instances in an IC design, where each dot in the diagram represents a cell instance in the IC, in accordance with some embodiments.

FIG. 6 depicts an example of a diagram showing waveform errors and the corresponding hold time constraint errors of cell instances in an IC design, where each dot in the diagram represents a cell instance in the IC, which waveform error is calculated based on the its library based waveform and its simulated waveform. As shown in FIG. 6, cell instances which waveform error and hold time constraint error violate the waveform error threshold (e.g., 4 V*ps) and the hold time constraint error threshold (e.g., 25 ps), respectively, are identified by DRC as risky cells during static timing analysis and are circled for design rule violations in FIG. 6.

In some embodiments, once the risky cells are identified by DRC as violating the design rules during static analysis, the risk cells may become subject for further re-optimization via, for a non-limiting example, a timing engineering change order (timing ECO) following the design of the IC. Such re-optimization of the design aims for a more robust design closer to circuit simulation results. In some embodiments, the re-optimization prefers adopting low threshold voltage (VT) cells in place of high VT cells. In some embodiments, transition constraints of the cells are refined during re-optimization of the design to reduce the waveform error and/or the hold time constraint error of the cells.

Figure 7:
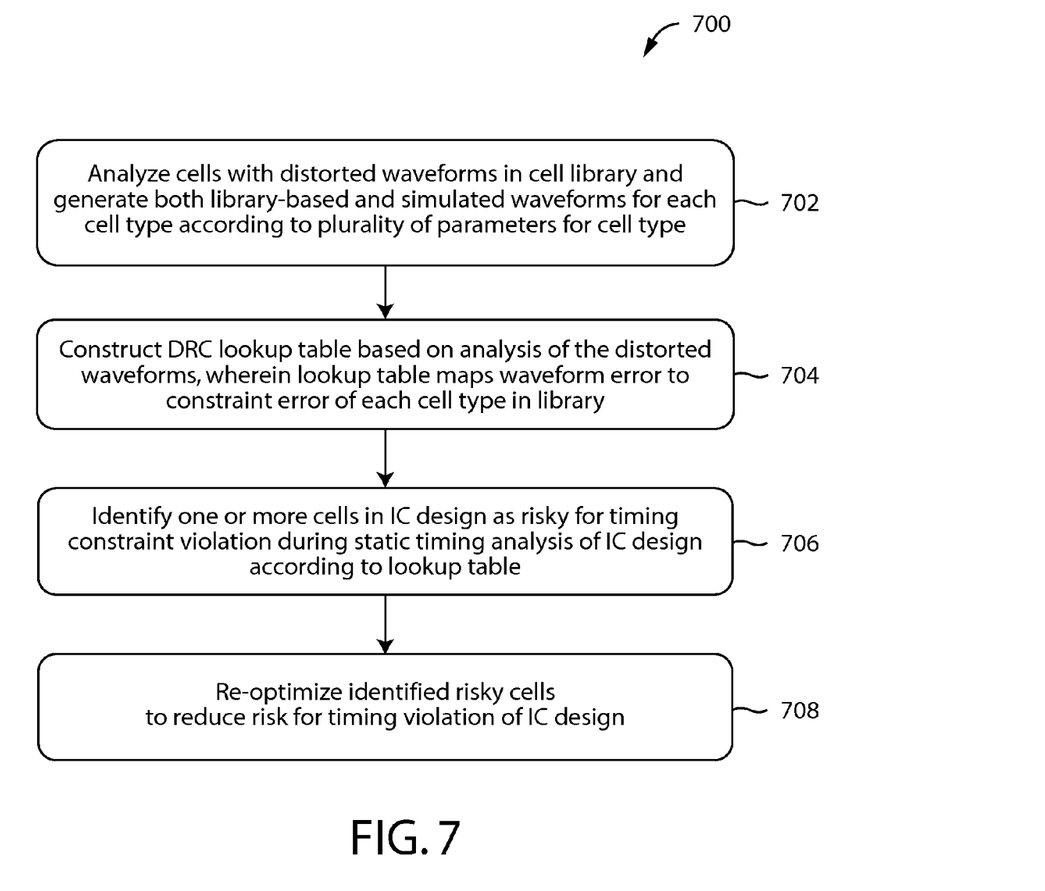
FIG. 7 is a flow chart of an example of a DRC process to prevent waveform distortion during static timing analysis of an IC design, in accordance with some embodiments.

FIG. 7 is a flow chart 700 of an example of a DRC process to prevent waveform distortion during static timing analysis of an IC design.

At step 702, cells with distorted waveforms in a cell library are analyzed and both library-based and simulated waveforms are generated for each cell type according to a plurality of parameters for the cell type.

At step 704, a DRC lookup table is constructed based on analysis of the distorted waveforms, wherein the lookup table maps waveform errors to the constraint errors for each cell type in the library.

At step 706, one or more cells in the IC design are identified as risky for timing constraint violation during static timing analysis of the IC design according to the DRC lookup table.

At step 708, the identified risky cells are re-optimized to reduce risk for timing violation of the IC design.

By identifying risky cells such as flip-flops with waveform distortion during static timing analysis, the approach discussed above reduces timing violation risks that current STA cannot discover and reduces the pessimism of additional margins during STA. In addition, by re-optimizing the identified risky cells following the design of the IC via, for a non-limiting example, timing ECO, the approach is able to generate a most robust design of the IC that is closer to circuit simulation results.

Figure 8:
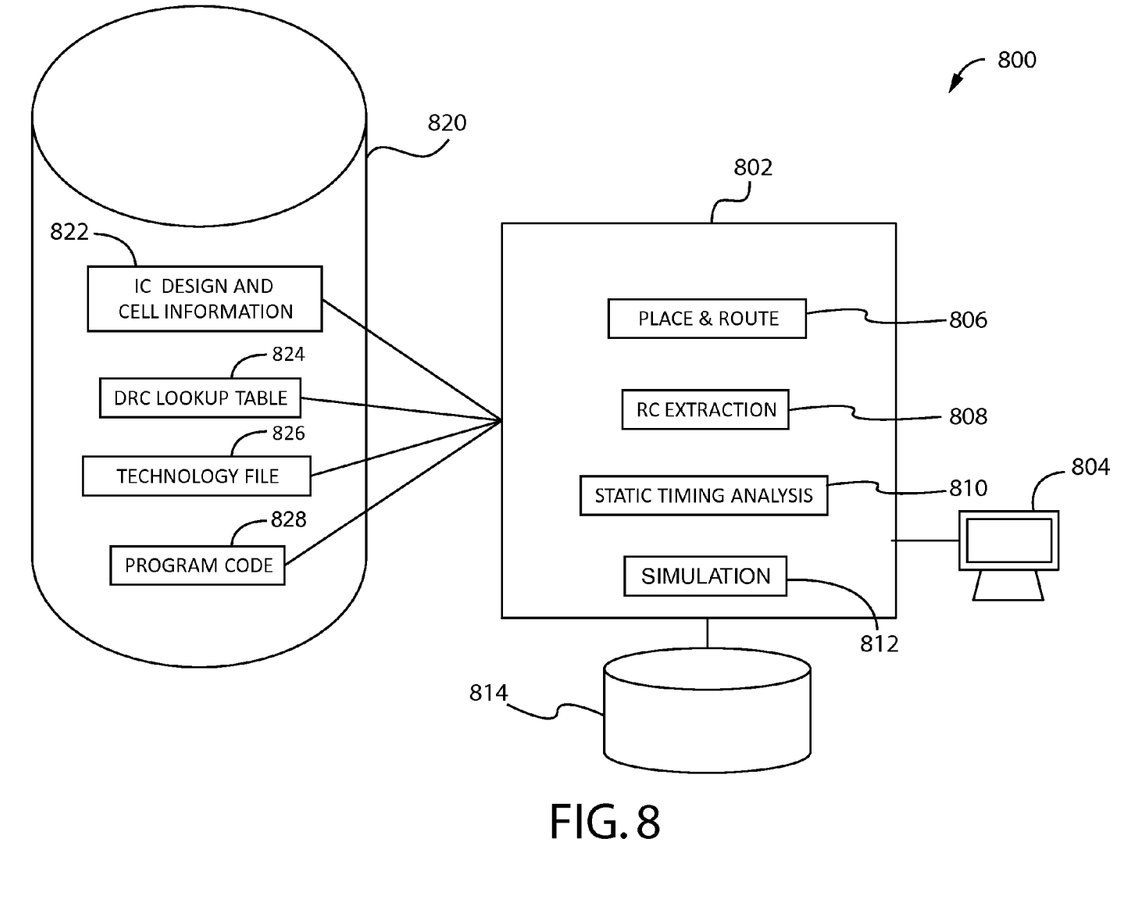
FIG. 8 are block diagrams of an example of a system 800 for performing the method described herein, in accordance with some embodiments.

FIG. 8 are block diagrams of an example of a system 800 for performing the method described herein. The system 800 includes at least one memory and/or a non-transitory, machine readable storage medium 820 encoded with data representing a layout of an integrated circuit (IC) design. These data stored on the storage medium 820 include block 822, which contains the IC design (netlist), designer's custom intellectual property (IP), and standard cell information, blocks 824, which includes the DRC lookup table discussed above, and blocks 824, which includes technology file(s) corresponding to a particular IC fabrication technology to be used for fabricating the IC. The non-transitory computer readable storage medium 820 is further encoded with computer readable computer program code 828, such that when a computing unit 802 executes the computer program code, the computing unit performs a method for generating, analyzing, validating or simulating an integrated circuit (IC) design. Although FIG. 8 shows an example with the data residing on a single medium 820, the data can be split among any number of storage devices, which can include locally attached devices, devices connected by personal area network (PAN), local area network (LAN), wide area network, or global communications network, such as the internet. The storage media can include, for example, RAMs, ROMs, CD-ROMs, DVD-ROMs, BD-ROMs, hard disk drives, flash memories, or any other non-transitory machine-readable storage medium.

In the example of FIG. 8, each computer/computing unit or processor 802 is configured to execute a plurality of modules and/or tools and an input device or computer 804 associated with a user is configured to enable the user to interact with the modules and/or tools running on the computing unit 802. A computer implemented static timing analysis (STA) tool 810 is programmed to perform one of a setup time analysis of an IC design according to the methods described above. In addition, the computing unit 802 is further configured to run an electronic design automation (EDA) tool that includes a variety of modules for design, synthesis, validation, and simulation of the IC design, only a subset of which are shown in FIG. 8. For non-limiting examples, following the development of a device level design, a place and route tool 806 places the standard cells and generates an initial layout of the custom interconnect routings connecting the various pins of the standard cells to each other. A RC extraction module 808 performs a parasitic RC extraction for the layout of the IC design and outputs, for each of a plurality of routing paths, a nominal capacitive coupling, a minimum capacitive coupling and a maximum capacitive coupling. A simulation tool 812 performs device level simulation (e.g., SPICE simulation) of the IC design. A non-transitory, machine readable storage medium 814 is provided for receiving and storing the results from the various modules running on the computing unit 802.

Although FIG. 8 shows a number of modules executed by a single computer, any number of computers can be used. The various modules shown can be hosted by the various computers in any combination. Although FIG. 8 shows an allocation of the various tasks to specific modules, this is only one example. The various tasks may be assigned to different modules to improve performance, or improve the ease of programming.

In some embodiments, a computer-implemented method for design rule checking (DRC) during static timing analysis (STA) of an integrated circuit (IC) design comprises analyzing cells with distorted waveforms in a cell library and generating both library-based and simulated waveforms for each cell type according to a plurality of parameters for the cell type. The method further comprises constructing a lookup table based on analysis of the distorted waveforms, wherein the lookup table maps waveform error to hold time constraint error of each cell type in the library and is saved in a memory. The method further comprises identifying one or more cells in the IC design as risky for timing constraint violation during static timing analysis of the IC design according to the lookup table and re-optimizing the identified risky cells to reduce risk for timing violation of the IC design.

In some embodiments, a system for design rule checking (DRC) during static timing analysis (STA) of an integrated circuit (IC) design comprises a computing device programmed with executable instructions that, when executed, analyze cells with distorted waveforms in a cell library and generate both library-based and simulated waveforms for each cell type according to a plurality of parameters for the cell type. The computing device is further programmed with executable instructions that, when executed, construct a lookup table based on analysis of the distorted waveforms, wherein the lookup table maps waveform error to hold time constraint error of each cell type in the library. The computing device is further programmed with executable instructions that, when executed, identify one or more cells in the IC design as risky for timing constraint violation during static timing analysis of the IC design according to the lookup table and re-optimize the identified risky cells to reduce risk for timing violation of the IC design.

In some embodiments, at least one computer-readable storage medium having computer-executable instructions embodied thereon, wherein, when executed by at least one processor, the computer-executable instructions cause the at least one processor to analyze cells with distorted waveforms in a cell library and generate both library-based and simulated waveforms for each cell type according to a plurality of parameters for the cell type, construct a lookup table based on analysis of the distorted waveforms, wherein the lookup table maps waveform error to hold time constraint error of each cell type in the library, identify one or more cells in the IC design as risky for timing constraint violation during static timing analysis of the IC design according to the lookup table and re-optimize the identified risky cells to reduce risk for timing violation of the IC design.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-implemented method for design rule checking (DRC) during a static timing analysis (STA) of an integrated circuit (IC) design, comprising:
   analyzing cells with distorted waveforms in a cell library and generating both library-based waveforms and simulated waveforms for each cell type according to a plurality of parameters for said each cell type;
   constructing a lookup table based on analysis of the distorted waveforms, wherein the lookup table maps a waveform error to a hold time constraint error of each cell type in the cell library and is saved in a memory;
   identifying one or more cells in the IC design as risky for timing constraint violation(s) during the STA of the IC design according to the lookup table and;
   re-optimizing the identified risky cell(s) to reduce risk for the timing constraint violation(s) of the IC design.

2. The computer-implemented method of claim 1, wherein:
   the plurality of parameters for the cell type include process, voltage, and temperature (PVT) set during fabrication, cell type, input slew, and output loading of the cell type.

3. The computer-implemented method of claim 1, further comprising:
   generating the distorted waveforms by one or more of a distortion delay and a starting voltage of waveform distortion.

4. The computer-implemented method of claim 1, further comprising:
   measuring the waveform error as an enclosed area between the library-based waveform and simulated waveform of the cell type.

5. The computer-implemented method of claim 1, further comprising:
   establishing a relationship between the waveform error and the hold time constraint error of the cell type via a linear regression.

6. The computer-implemented method of claim 5, wherein:
   the hold time constraint error is highly sensitive to the waveform error when input slew rate of the cell type is small.

7. The computer-implemented method of claim 1, further comprising:
   identifying a cell as risky if the waveform error at a pin of cell exceeds a threshold on the waveform error and/or a threshold on the hold time constraint error for the type of the cell according to the DRC table.

8. The computer-implemented method of claim 1, further comprising:
   re-optimizing the identified risky cells in the IC design via a timing engineering change order (timing ECO).

9. The computer-implemented method of claim 1, further comprising:
   re-optimizing the identified risky cells in the IC design by adopting low threshold voltage (VT) cells in place of high VT cells.

10. The computer-implemented method of claim 1, further comprising:
    re-optimizing the identified risky cells in the IC design by refining transition constraints of the cells to reduce the waveform error and/or the hold time constraint error of the cells.

11. A system for design rule checking (DRC) during a static timing analysis (STA) of an integrated circuit (IC) design, comprising:
    a computing device programmed with executable instructions that, when executed, cause the computing device to:
    analyze cells with distorted waveforms in a cell library and generate both library-based waveforms and simulated waveforms for each cell type according to a plurality of parameters for said each cell type;
    construct a lookup table based on analysis of the distorted waveforms, wherein the lookup table maps a waveform error to a hold time constraint error of each cell type in the cell library and is saved in a memory;
    identify one or more cells in the IC design as risky for timing constraint violation(s) during the STA of the IC design according to the lookup table and;
    re-optimize the identified risky cell(s) to reduce risk for the timing constraint violation(s) of the IC design.

12. The system of claim 11, wherein:
    the plurality of parameters for the cell type include process, voltage, and temperature (PVT) set during fabrication, cell type, input slew, and output loading of the cell type.

13. The system of claim 11, wherein:
the computing device is programmed with executable instructions that, when executed, generate the distorted waveforms by one or more of a distortion delay and a starting voltage of waveform distortion.

14. The system of claim 11, wherein:
the computing device is programmed with executable instructions that, when executed, measure the waveform error as an enclosed area between the library-based waveform and the simulated waveform of the cell type.

15. The system of claim 11, wherein:
the computing device is programmed with executable instructions that, when executed, establish a relationship between the waveform error and a threshold on the hold time constraint error of the cell type via a linear regression.

16. The system of claim 11, wherein:
the computing device is programmed with executable instructions that, when executed, identify a cell as risky if the waveform error at a pin of the cell exceeds a threshold on the waveform error and/or the hold time constraint error for the type of the cell according to the DRC table.

17. The system of claim 11, wherein:
the computing device is programmed with executable instructions that, when executed, re-optimize the identified risky cells in the IC design via a timing engineering change order (timing ECO).

18. The system of claim 11, wherein:
the computing device is programmed with executable instructions that, when executed, re-optimize the identified risky cells in the IC design by adopting low threshold voltage (VT) cells in place of high VT cells.

19. The system of claim 11, wherein:
the computing device is programmed with executable instructions that, when executed, re-optimize the identified risky cells in the IC design by refining transition constraints of the cells to reduce the waveform error and/or the hold time constraint error of the cells.

20. At least one non-transitory computer-readable storage medium having computer-executable instructions embodied thereon, when executed by at least one processor, cause the at least one processor to:
analyze cells with distorted waveforms in a cell library and generate both library-based waveforms and simulated waveforms for each cell type according to a plurality of parameters for the cell type;
construct a lookup table based on analysis of the distorted waveforms, wherein the lookup table maps a waveform error to a hold time constraint error of each cell type in the cell library;
identify one or more cells in an integrated circuit (IC) design as risky for a timing constraint violation during a static timing analysis of the IC design according to the lookup table and;
re-optimize the identified risky cell(s) to reduce risk for the timing constraint violation of the IC design.

* * * * *